United States Patent
Reuschel et al.

(10) Patent No.: US 6,846,269 B2
(45) Date of Patent: Jan. 25, 2005

(54) CONTROL APPARATUS AND METHOD FOR CONTROLLING DRIVE TRAIN ELEMENTS

(75) Inventors: Michael Reuschel, Ottersweier (DE); Anton Fritzer, Markdorf (DE)

(73) Assignee: LuK Lamellen und Kupplungsbau Beteiligungs KG, Bühl (DE)

(*) Notice: Subject to any disclaimer, the term of this patent is extended or adjusted under 35 U.S.C. 154(b) by 32 days.

(21) Appl. No.: 09/945,543

(22) Filed: Sep. 2, 2001

(65) Prior Publication Data

US 2002/0042327 A1 Apr. 11, 2002

(30) Foreign Application Priority Data

Sep. 8, 2000 (DE) .......................... 100 44 337

(51) Int. Cl.⁷ .......................... B60K 41/04; B60K 41/02
(52) U.S. Cl. ...................... 477/110; 477/175
(58) Field of Search .............................. 477/175, 181, 477/78, 107, 110

(56) References Cited

U.S. PATENT DOCUMENTS

| | | | | |
|---|---|---|---|---|
| 5,024,305 A | * | 6/1991 | Kurihara et al. | 477/175 |
| 5,184,301 A | * | 2/1993 | Stasell | 477/181 X |
| 5,681,242 A | * | 10/1997 | Bates | |
| 5,993,355 A | * | 11/1999 | Nordgard | 477/175 X |
| 6,223,874 B1 | * | 5/2001 | Wheeler | 477/175 X |

* cited by examiner

*Primary Examiner*—Roger Pang
(74) *Attorney, Agent, or Firm*—Alfred J. Mangels (57) ABSTRACT

A method and apparatus for controlling a motor vehicle drive train component. The motor vehicle includes an engine control device and a clutch control device. The method and apparatus control the clutch control device and the engine control device so that they do not simultaneously control or regulate the same operating parameter of the drive train.

46 Claims, 2 Drawing Sheets

CONTROL APPARATUS AND METHOD FOR CONTROLLING DRIVE TRAIN ELEMENTS

BACKGROUND OF THE INVENTION

1. Field of the Invention

The present invention relates to a method for controlling at least one drive train component of a motor vehicle, as well as to a control apparatus arrangement for carrying out the method.

2. Description of the Related Art

Methods for controlling drive train components, as well as control units that can carry out such methods, are already known.

In one method for controlling drive train components, known at least to the applicant, on the one hand a clutch is arranged in a motor vehicle drive train and on the other hand an internal combustion engine, and each is regulated by a control device. In that method, the engine rotational speed can be regulated by an engine control unit as well as by a clutch control unit. The clutch control unit regulates the engine rotational speed in that it adjusts the torque transmitted by the clutch such that the engine rotational speed is caused to be at its set value. Hereby the result is that at a given output power with increasing slippage between an engine-side clutch element and an output-side clutch element, the engine torque is diminished and the engine rotational speed is increased.

In a further method known at least to the applicant, the internal combustion engine or a clutch of a motor vehicle is controlled as a function of different driving conditions of the motor vehicle and in accordance with different characteristics. A first driving condition is creeping, in which the clutch apparatus, especially an automatic clutch, is increasingly closed in accordance with a predetermined characteristic to the extent that the transmittable clutch torque is smaller than a predetermined limit, a predetermined start-up gear, such as the first gear, is engaged, the vehicle brake is not actuated, the accelerator pedal is not actuated, and the vehicle speed is lower than a predetermined speed limit.

A second driving condition is "starting," in which the accelerator pedal is actuated and, if need be, further steps are carried out. Such steps are, for example, that the clutch slips and/or an engine and/or transmission rotational speed that is set as a function of the accelerator pedal position was not yet reached after starting the engine, or the vehicle is being operated in a start-up gear, such as first gear or second gear, or the like.

A third drive status is "driving," which is functionally separated from starting.

A fourth drive status is "deceleration," in which the vehicle is being braked, that is, especially by means of a service brake.

In accordance with the known method, it is provided that during "creeping" as well as during "starting," the engine rotational speed is controlled, while during "driving" or "deceleration" or "stopping" the engine torque is controlled.

In accordance with a further method, known at least to the applicant, the foregoing methods are combined in a control strategy.

An object of the invention is to provide a differently configured method for controlling drive train components as well as differently configured control devices.

SUMMARY OF THE INVENTION

In accordance with a particular aspect, an object of the invention is to provide a method for controlling drive train components, or an arrangement of components, by at least one control device that makes possible a more effective and reliable control of drive train components.

In accordance with one aspect, an object of the invention is to provide a method for controlling drive train components, as well as an arrangement, by at least one control device that at least reduces the danger of the rise of predetermined operating parameters of the drive train, such as engine rotational speed.

In accordance with a particular aspect, an object of the invention is to provide a method for controlling drive train components, or an arrangement of components, by at least one control device that prevents the operating parameters of the drive train, such as engine rotational speed, from being simultaneously regulated in accordance with conflicting characteristics.

In accordance with a particular aspect, an object of the invention is to provide a method for controlling drive train components, or an arrangement of components, by at least one control device, which prevents an increase in rotational speed when starting-up and driving a motor vehicle.

In accordance with a particular aspect, an object of the invention is to make starting-up and driving a motor vehicle to be more comfortable for the driver.

The objective is accomplished by a method for controlling a drive train component of a motor vehicle that has at least one feature of the features that are described in the following description or the claims or are illustrated in the drawing figures.

The objective is further accomplished through a control device arrangement that has at least one feature of the features that are described in the following description or in the claims, or are illustrated in the drawing figures.

In accordance with the invention, in particular, a method for controlling at least one component of a motor vehicle drive train is provided, by which predetermined signals are transmitted between an engine control device and a clutch control device, which affect the control activities of at least one of those control devices.

Control activities, which can also be adjustment activities within the meaning of the present invention, are within the meaning of the present invention especially control events or control methods that can be conducted by one of those clutch devices. The control activities relate in particular to the control of predetermined operating parameters, which especially are the parameters of the respective drive train component to which that respective control device is associated. If need be, the control activities also relate to operating parameters of another power train component, which can be implemented by a control device that is associated with another drive train component. Purely by way of example, but without restricting the invention thereby, it should be mentioned in that connection that an engine control device in a preferred embodiment of the invention can control the engine rotational speed, whereby that engine control device is associated with the engine, that is, the internal combustion engine, and that a clutch control device, which is associated with a clutch apparatus, can control the engine rotational speed since it causes the clutch apparatus to be shifted into a specific engagement status by which the engine rotational speed is controlled, especially as a function of further parameters or operating parameters, such as throttle valve angle or the like.

Within the meaning of the invention, there is provided a motor vehicle and a drive train of a motor vehicle which has in particular a drive system and a clutch system. The drive system is particularly an internal combustion engine.

The clutch system is in particular preferably a friction clutch that can transmit torque by means of friction faces. An especially preferred clutch system is an automated clutch, which preferably is configured as it is offered and marketed by the applicant under the designation "electronic clutch management (EKM)". Preferably, an electronic clutch has a positioning apparatus that can influence the engagement status of the clutch. The positioning apparatus preferably has a clutch drive arrangement, which preferably has an electric motor and/or a hydraulic pressure source, whereby a positioning force is generated from the drive arrangement, with which the engagement status of the clutch can be changed. An electronic control device is especially preferably provided that actuates the drive apparatus and/or certain other structural components of the positioning apparatus. The power or torque transmission within the positioning apparatus can take place through hydraulic structural components, and/or mechanical structural components, or in other ways. If need be, the positioning apparatus has a piston system. Preferably, the positioning apparatus, at least if it is at least partially configured as a hydraulic positioning apparatus, has valves that are especially electromagnetically controllable. The invention, though, should not be restricted by those preferred configurations of a positioning apparatus or of an electronic control device.

If need be, a gear system is further provided in the drive train, which can be configured as a manually-shifted transmission, or as an automatic transmission, or as a steplessly changeable transmission, or as an automated shift transmission (ASG), or in other ways.

In accordance with the invention, in particular an engine control device is provided that controls the drive apparatus, especially the internal combustion engine, as well as a clutch control unit, which controls the clutch apparatus or the clutch drive apparatus, or predetermined components of the positioning system of the clutch apparatus. The invention should not be restricted by those exemplary areas or components that are controlled by the clutch control device. In particular, the clutch control device influences the engagement status of the clutch. Preferably, within the meaning of the present invention, the clutch control device is constructed such that it can control predetermined operating parameters of the drive train, and in particular of the clutch, such as the torque transmittable by the clutch or the like. Those operating parameters are, if need be, parameters that are not parameters of the clutch apparatus.

In accordance with the invention, it is particularly provided that predetermined operating parameters can be transmitted to the clutch control device, as a function of which the clutch control device controls predetermined parameters of the drive train. Purely by way of example, and not that the invention should be restricted, it should be mentioned that the clutch control device, if need be, under predetermined conditions for controlling the engine rotational speed, receives the current engine torque and/or the current engine rotational speed and/or the current wheel rotational speed and/or the adjusted transmission ratio and/or the like, and ascertains as a function of those parameters and, if need be, further parameters or a portion of those parameters, whether and in which way the clutch must be further engaged or further disengaged in order to bring about the desired engine rotational speed.

The engine control device can cause a predetermined first component of the drive apparatus to be shifted into predetermined positions, and the clutch control device can cause a predetermined second component of the clutch apparatus to be shifted into predetermined positions. Those respective positions influence predetermined operating parameters of the drive train under predetermined conditions.

It is especially preferable to provide that the position of the first component of the drive apparatus cannot be influenced by the clutch control device and the position of the second component of the clutch apparatus cannot be influenced by the engine control device. Preferably, the position of the first component cannot be influenced by the clutch control device without the clutch control device sending a signal to the engine control device, or to an overriding control device, which indicates that the position of the first component should be changed. Preferably, the position of the second component of the clutch apparatus cannot be influenced by the engine control device without the engine control device sending a signal to the clutch control device, or to an overriding control device, which indicates that the position of the second component should be changed.

It is especially preferred that the first component is a throttle valve, the valve angle of which is controlled by the engine control device. Preferably, the second component of the clutch apparatus is a component such as a pressure plate, or the like, or an arrangement of components, which determine the torque transmittable by the clutch apparatus.

By means of the engine control device as well as by means of the clutch control device, in any given case at least one operating parameter of the drive train can be influenced or controlled.

It should be noted that within the meaning of the present invention, it is to be understood that by control is meant, in particular, a control within the meaning of DIN (German Industry Standard) and/or a regulation within the meaning of DIN, thus especially an open-loop control or a closed-loop control.

Purely by way of example, and without restricting the invention, control or regulation possibilities of that type should be explained in greater detail. For example, the clutch control device can control or regulate at a given throttle valve angle and when the brake is not activated or with a constant position of the accelerator pedal. Consequently, especially with a given drive output provided by the internal combustion engine, the clutch control device controls or regulates the engine rotational speed while it causes the torque transmittable from the clutch apparatus to be adjusted in accordance with the desired engine rotational speed. In accordance with the action=reaction principle, a further closing of a partially closed clutch control apparatus causes engine torque to rise and, as a consequence, the engine rotational speed to decrease. In a corresponding manner, at a given drive output of the internal combustion engine and at least partial engagement of the clutch apparatus, an increasing opening of the clutch apparatus, or a reduction of the torque transmittable by the clutch, can cause engine torque to decrease, and consequently the engine rotational speed to increase.

Engine rotational speed can, however, on the other hand, be controlled by the engine control apparatus, and, indeed, especially by changing the throttle valve angle.

In accordance with the invention, it is in particular provided that the first and second operating values are identical or different, whereby it is especially preferably provided that the clutch control device and the engine control device do not simultaneously control or regulate the same operating parameter of a drive train.

The signal that affects the control activities of a control device is, within the meaning of the present invention in particular, a signal that indicates that the affected control device is directly regulating a predetermined operating parameter of the drive train, or a signal that inquires whether the other control device is directly regulating a predetermined operating parameter of the drive train, or another signal that affects the control activities of the control device.

It is especially provided in accordance with the invention that at least one of the control devices, that is, the engine control device and/or the clutch control device, registers at least one portion of the control characteristic of the other of those control devices. In particular, engine-representative condition is reported to the clutch control device and clutch-representative condition to the engine control device. The respective control characteristic or the respective representative condition means, within the meaning of the present invention, especially control activities that are initiated when predetermined operating parameters exist. Thus, preferably, information is made available for the engine control device or the clutch control device that reports how the other, or in any given case another control device, is changing an adjustable component of the engine or the clutch apparatus, or that the control device in question is regulating or controlling a predetermined operating parameter when predetermined operating parameters exist. For example, without the invention being restricted, information about at what predetermined operating parameters the engine control device is regulating the engine rotational speed for a predetermined idle rotational speed is made available to the clutch control device. The affected control device to which that information is made available can then, as a function of that control characteristic of another control device or, in any given case, the other control device, if need be, omit its own control activities if it is established that the other control device is presently regulating an operating parameter that other control device does not intend to regulate.

The engine-representative condition is especially preferably implemented in clutch software implemented in the clutch control device, and/or the clutch-representative condition is implemented in engine software of the engine control device.

In accordance with the invention, it is particularly provided that at least one of the control devices, thus the engine control device and/or the clutch control device, conducts control activities as a function of the control activities of, in any given case, the other of those control devices. The control activities of the other control device are in particular actual or imminent control activities. Preferably, that dependency is arranged such that a control device omits a predetermined control activity if the regulation of a predetermined operating parameter of the other control device is presently regulating that operating parameter, or a regulation of that operating parameter by the other control device is imminent. Especially preferably, there is thereby provided a priority characteristic that establishes which control activities of the respective control devices have priority over the control activities of, in any given case, the other control device. Preferably, it is thereby provided that the clutch control unit discontinues conducting an engine rotational speed regulation when it is established or indicated that the engine control unit is currently conducting an engine rotational speed regulation, or such is immediately imminent.

The engine rotational speed regulation is preferably a regulation of the idle rotational speed.

Preferably a control device, which, as a function of the control activities of the other control device under predetermined conditions, if need be, alternatively omits a regulation of another operating parameter. For example, and the invention should not be restricted hereby, the clutch control device causes only an engine torque regulation or control, but no engine rotational speed regulation if it is indicated to the clutch control device under predetermined conditions that the engine control device is currently or immediately about to conduct an engine rotational speed regulation. If need be, the clutch control device conducts an engine rotational speed regulation when it is indicated to it that the engine control device has completed the engine rotational speed regulation.

Preferably the control activities are coordinated through a master-slave procedure which establishes which control activities of the engine control device have priority over the control activities of the clutch control device, and vice versa.

If need be, the master-slave procedure is configured such that the master control unit is, as a function of predetermined conditions or temporarily, the clutch control device, or temporarily or as a function of predetermined conditions, the engine control device.

The possible variations are now very widely spread without abandoning the invention.

In accordance with the invention, it is especially provided that the control activities of an engine control device and a clutch control device are coordinated under predetermined conditions and, indeed, in particular, by means of a priority characteristic.

The priority characteristic is preferably arranged such that current or immediately imminent control activities of one of the control devices, if need be, as a function of the controlled operating parameter, is granted a priority. The priority characteristic can, in particular, be arranged such that a priority is continuously conceded to regulating a predetermined operating parameter through a predetermined control device in regard to the operating parameter, or such that a priority is continuously conceded to regulation by one of those control devices, or such that a priority is continuously conceded to regulation by the control device that has introduced the regulation earlier, or in another manner.

Furthermore, coordination or harmonizing of control or regulatory activities of the engine control device and the clutch control device is preferred where no priority characteristic exists.

By means of the harmonization or coordination of the control or regulation activities of the engine control device and the clutch control device, that those two control devices simultaneously regulate the same operating parameter, and, to be sure, especially to different values, is preferably avoided.

Preferably, it is provided that the control activities of the engine control device and the clutch control device are coordinated or harmonized with each other such that those control devices are not simultaneously utilizing the same controlled variable.

The engine control device and the clutch control device are especially preferably coordinated or harmonized with each other such that no undesired feedback occurs. Preferably, the control activities of the engine control device and of the clutch control device are coordinated with each other in such a way that those control devices do not set at the same time different command signals for the same operating parameter. Preferably the engine control device and the clutch control device are harmonized with each other, or corresponding control activities are coordinated with each other, such that the one of those control devices, to the extent that it is actually acting as a component part of the controlled system of the other of those control devices, the manipulated variable of the other of those control devices is not changed or is limited to a predetermined value. That predetermined value can be, in particular, an absolute value, or a percentage indication in relation to the manipulated variable, such as, for example, 20%, or 15%, or 10%, or 5%, or 3%, or 1%, or the like. The invention is not to be restricted by those indications. Those exemplary embodiments of coordination or harmonization of the control devices should not restrict the invention. It should be noted that those exemplary embodiments can exist in any desired combination or individually, or the harmonization or coordination of the control devices can be configured in another way.

In accordance with the invention, it is, in particular, provided that the engine control device and/or the clutch control device indicates to the other of those two control devices under predetermined conditions by means of a signal, and if need be at what value, that control device is controlling or regulating a predetermined operating parameter of the drive train, and to be sure it is actually controlling or regulating or that control or regulation is immediately imminent. If need be, that signal is processed in the other of those control devices.

Control activities of the other of those control devices are especially preferably conducted as function of that signal. If need be, the other control device omits an intended control of an operating parameter of the drive train under predetermined conditions as a function of the signal transmitted to it. Furthermore, it is preferred that the other of those control devices indicates to the one of those control devices that it likewise intends or is directly conducting the control or regulation of that operating parameter. If need be, a priority characteristic is provided in accordance with which one of those control devices adjusts or discontinues its control. Furthermore, it is preferred that none of those control devices continues or begins its control activities if it is determined that both control devices want to control or regulate, or are currently controlling or regulating, the same operating parameter.

Preferably an emergency strategy is provided, which is activated if it is determined that the engine control device and the clutch control device are regulating or controlling, or else wish to regulate or wish to control, the same operating parameter. The emergency strategy can be arranged such that a control or regulation is started by one or both of those control devices, or by an overriding control device in accordance with a predetermined characteristic, or such that the control or regulation activities desired are first suspended, and a new control or regulation strategy is determined as a function of predetermined operating parameters, which, if need be, is initiated by one of those control devices, or in another manner.

In accordance with the invention, a method for control of at least one drive train component of a motor vehicle is in particular provided, where predetermined operating parameters of the drive train are controlled during the start-up phase of the motor vehicle in accordance with a start-up characteristic, and in accordance with a drive characteristic during the drive phase.

Those operating parameters are in particular operating parameters of the drive apparatus of the drive train such as of an internal combustion engine or of a clutch apparatus provided in the drive train. In accordance with the invention, it is in particular provided that the engine rotational speed is regulated during the start-up phase of the motor vehicle. It is especially preferably provided that engine torque is not regulated during the start-up phase of the motor vehicle.

Preferably, the start-up phase of the motor vehicle, after starting the engine, exists during a period of time that is before the drive phase of the motor vehicle. The start-up phase is especially preferably started when the accelerator pedal of the motor vehicle is actuated for the first time after starting the engine.

The start-up phase is, in particular, preferably ended and the drive phase is started when predetermined operating parameters are given. Those operating parameters can be arranged differently and can, if need be, determine the transition from the start-up phase to the drive phase in combination with several operating parameters. Preferably, one of those operating parameters, which determine the transition from the start-up phase to the drive phase, the throttle valve angle, and/or the engine rotational speed, and/or engine torque, and/or the gear ratio existing in a transmission, or the gear engaged in a transmission, and/or the clutch torque, and/or another operating parameter.

Preferably, in any given case, the same operating parameter is regulated in the start-up phase and in the drive phase of the motor vehicle, and, indeed, especially the engine rotational speed.

The regulation of those operating parameters is preferably effected by an engine control device and/or by a clutch control device.

Preferably, the start-up phase, within the meaning of the present invention, is ended in that the engine rotational speed corresponds substantially with the transmission rotational speed.

In accordance with a preferred embodiment of the invention, the start-up phase, in the meaning of the present invention, is ended in that the engine rotational speed as well as the transmission rotational speed correspond with a predetermined, specified rotational speed under load, whereby the engine rotational speed and the transmission rotational speed are identical. Preferably, the start-up phase, within the meaning of the present invention, is ended when the engine rotational speed and the transmission rotational speed are identical, and it is assured that the deviation of those rotational speeds is at least equal to zero until a predetermined speed under load is reached.

In accordance with the invention, it is in particular provided that a predetermined speed under load is specified, which is to be actuated when the engine rotational speed and the transmission rotational speed are substantially identical at the end of the start-up phase, or the clutch apparatus is completely engaged, or the torque transmittable from the clutch apparatus is greater than the engine torque.

The speed under load is preferably controlled when the engine rotational speed and the transmission rotational speed are substantially identical at the end of the start-up phase, even if only for a short time.

It is especially preferably assured that the engine rotational speed and the transmission rotational speed are substantially maintained at an identical value if they were identical for the first time at the end of the start-up phase, and, indeed, especially until the speed under load is reached.

In accordance with the invention, it is especially provided that, after it was established that the engine rotational speed is substantially identical with the transmission rotational speed at the end of the start-up phase, it is assured that the rotational speed differential between the speed under load and the rotational speed at which the engine rotational speed is equal to the transmission rotational speed at the end of the start-up phase is greater than zero.

It is especially preferably assured or controlled that the engine rotational speed, after it has reached the transmission rotational speed, substantially corresponds with the transmission rotational speed, at least until the speed under load is attained, whereby it is continuously assured that the difference between the speed under load and the common rotational speed is greater than zero.

Preferably, it is provided that the rotational speed difference is greater than zero until the speed under load is first reached.

In accordance with the invention, it is, in particular, provided that the engine rotational speed and the transmission rotational speed do not substantially exceed the speed under load until the engine rotational speed and the transmission rotational speed jointly attain the speed under load, especially for the first time.

Preferably, it is assured that the difference in amount between the engine rotational speed gradient and a predetermined gradient of an output-side rotational speed of the drive train, such as the transmission rotational speed gradient, is less than a predetermined limit, and to be sure especially during the transition from the start-up phase to the drive phase and/or at the end of the start-up phase. Preferably, it is provided in that connection that the engine rotational speed gradient is regulated.

Preferably, the engine rotational speed gradient is regulated during the start-up phase.

The engine rotational speed and/or the engine rotational speed gradient is especially preferably regulated in the start-up phase, at least at the end of the start-up phase, as a function of an output-side rotational speed, especially as a function of the transmission rotational speed, and/or as a function of the gradient of an output-side rotational speed.

Within the meaning of the present invention, an output-side rotational speed is to be particularly understood to be the rotational speed of a component that is arranged in the drive train between a clutch apparatus and the drive wheels. In accordance with the invention, it is in particular provided that the output-side rotational speeds are measured or determined in some other manner, especially calculated. The output-side rotational speed is in particular the transmission rotational speed, which especially is the transmission input speed, or a wheel speed or another rotational speed. It is especially preferably provided that the output-side rotational speed is a transmission speed or a transmission input speed, which on the basis of at least one recorded wheel speed, especially as a function of the transformation of a transmission apparatus, is determined or calculated. Within the meaning of the invention, a gradient of an output rotational speed is in particular the gradient of one of the previously-described output-side rotational speeds.

Preferably, a target engine rotational speed is specified, especially in the start-up phase and/or the drive phase.

A target engine rotational speed gradient and/or a reliable, especially maximum, target engine rotational speed gradient is especially preferably specified as a function of at least a predetermined third operating parameter, such as, in particular, the target engine rotational speed and/or the actual engine rotational speed and/or a predetermined rotational speed difference, such as especially the difference between the target engine rotational speed and the actual engine rotational speed, and/or as a function of a predetermined gradient of an output-side rotational speed, such as, in particular, the transmission rotational speed, or as a function of a predetermined rotational speed ratio, especially the ratio of an output-side rotational speed and the engine rotational speed, a target engine rotational speed gradient and/or a reliable, in particular maximum, target engine rotational speed gradient.

It is especially preferably provided that, as a function of the difference between the target engine rotational speed and the actual engine rotational speed, a target engine rotational speed gradient is specified, whereby with greater rotational speed differences, the target engine rotational speed gradient is arranged to be greater, and with smaller rotational speed differences the target engine rotational speed gradient is arranged to be smaller.

Preferably, a superimposition characteristic is utilized for specification of a target engine rotational speed gradient.

Within the meaning of the present invention, a superimposition characteristic is a characteristic or a function that takes a predetermined operating parameter into consideration, and, indeed, especially increasingly takes it into consideration. The parameter can be time or a predetermined operating parameter, or a parameter that is determined in accordance with a predetermined reference characteristic, or another parameter.

The parameter is especially preferably a superimposition factor, which is determined as a function of a predetermined operating parameter, as, for example, the rotational speed quotient on the basis of an output rotational speed and the engine rotational speed.

The superimposition characteristic is especially preferably arranged such that a superimposition factor is multiplied by the operating parameter, which is to be taken into consideration, especially increasingly, in determining the target engine rotational speed gradient, whereby that product is considered as an addend in determining the target engine rotational speed gradient.

The superimposition factor is especially preferably arranged such that it can accommodate values between zero and one. However, that should not restrict the invention.

Preferably, the superimposition characteristic is dependent upon a predetermined rotational speed ratio of an output-side rotational speed and the engine rotational speed.

The gradient of an output-side rotational speed is especially preferably considered as a function of a predetermined parameter in determining the target engine rotational speed gradient. Preferably, an output-side rotational speed is multiplied by a superimposition factor which unvaryingly increases with increasing rotational speed ratios of an output-side rotational speed and the engine rotational speed, whereby the product on the basis of the output-side rotational speed and the superimposition factor is especially preferably taken into consideration as an addend in determining the target engine rotational speed gradient.

The target engine rotational speed gradient preferably rises with an increasing gradient of an output-side rotational speed.

The target engine rotational speed gradient is, within the meaning of the present invention, in particular an engine rotational speed gradient that is to be controlled, or an allowable, especially a maximum, target engine rotational speed gradient.

The target engine rotational speed gradient is preferably determined as a function of a sum which has an addend that is a function of a predetermined rotational speed difference, such as, in particular, the rotational speed difference between a target engine rotational speed and an actual engine rotational speed, and which has an addend that is a function of an output-side rotational speed and/or an output-side rotational speed gradient.

A target engine rotational speed gradient is especially preferably specified in different time windows during the start-up event, in each case by means of partially different operating parameters.

The determination or specification of a target engine rotational speed gradient described in the framework of the invention preferably relates to the start-up phase of a motor vehicle.

A pre-control component of engine target torque is preferably determined and/or specified in accordance with a predetermined characteristic for determining or controlling an engine target torque, and, indeed, especially in the drive phase and/or the start-up phase.

A pre-control component of the engine target torque is especially preferably specified in accordance with a predetermined characteristic, whereby the engine target torque, based upon that pre-control component, is governed by means of a regulator or is finely tuned, so that in particular the component of the engine target torque determined by the regulator and the pre-control component of the engine target torque are combined.

The engine actual torque is preferably utilized for determining the engine target torque. The engine actual torque can be utilized as a measured value or as a calculated value, and especially as a value made available by a control device, or in another manner.

The engine actual torque is preferably utilized in determining a pre-control component of the engine target torque.

Especially preferred is an engine target torque and, to the extent that a pre-control component is utilized, especially the portion of the target torque regulated by means of a regulator as a function of at least an engine rotational speed, such as the actual and/or the target engine rotational speed.

The engine target torque is preferably determined as a function of the difference between the target and actual engine rotational speed during the start-up phase.

The engine target torque is especially preferably determined as a function of at least one engine rotational speed gradient, such as the target engine rotational speed gradient, and, indeed, especially in the start-up phase of the motor vehicle.

A clutch target torque or a torque transmittable by the clutch apparatus is preferably determined as a function of at least one engine rotational speed gradient, such as the actual and/or target engine rotational speed gradient.

A regulator, in particular a proportional-integral control unit, is preferably utilized for determination of the engine target torque.

The engine torque or engine actual torque, which is utilized for pre-control of the engine target torque and/or for determination of the engine target torque, is made available by an engine control device, and, indeed, is made available especially during the start-up phase of a motor vehicle.

Preferably, the engine torque utilized, and especially the engine torque utilized for determining an engine target torque or a pre-control component of an engine target torque, is made available as an engine torque signal by an engine control device, whereby, if need be, that signal or that engine torque is filtered and/or the gradient of that made-available engine torque is limited, and, indeed, especially in order to avoid undesired fluctuations.

It should be noted that a method in accordance with of the invention is preferably carried out during the start-up phase of a motor vehicle.

Preferably, the control activities of the engine control device and the clutch control device are synchronized or coordinated as a function of signals that are transmitted between those control devices. That synchronization or coordination can especially be arranged such that one of those control devices at least temporarily does not regulate a predetermined operating parameter, which it intends to regulate, at least if a transmitted signal indicates that the other control device is regulating that operating parameter or intends to regulate it.

Preferably, an overriding control device is provided that can communicate with the clutch control device and/or the engine control device and, indeed, especially such that between those control devices and the overriding control device, signals are transmitted or exchanged. The synchronization or coordination of control activities of the engine control device and the clutch control device is especially preferably affected by means of that overriding control device.

Preferably, a portion or the entire control characteristic of the other control device, in any given case, is reported to the clutch control device and/or to the engine control device. It is especially preferred in each case that the reported portion of the control characteristic is reported to the other control device, that there is reported to the engine control device or to the clutch control device a portion or the entire control characteristic of the other of those control devices, whereby those reported control characteristics in particular report in accordance with which characteristic or at which value through which the other control device regulates or controls a predetermined operating parameter, and, indeed, as a function of predetermined points in time, or if predetermined operating parameters exist, or if other conditions are determined. That reported portion of the control characteristic of the other control device, in any given case, is stored in the control device to which the control characteristic is reported. Preferably, at least a portion of the control characteristic of the engine control device is implemented in the clutch software of the clutch control device, and/or at least a portion of the control characteristic of the clutch control device is implemented in the engine software of the engine control device.

The control device that has reported at least a portion of the control characteristic of the other control device especially preferably controls, as a function of that control characteristic, at least a predetermined operating parameter. It is especially preferably provided that predetermined operating parameters are reported to the clutch control device and/or to the engine control device. Those predetermined operating parameters can be detected operating parameters, which are in particular detected by means of a sensor, or calculated operating parameters, or operating parameters determined or established in some other way.

Preferably, it is provided that the control device, such as the engine and/or clutch control device, for which at least a part of the control characteristic of the other control device, in any given case, is made available as a function of that control characteristic and as a function of predetermined operating parameters, which are reported to that control device, controls at least one operating parameter of the drive train, or discontinues controlling an operating parameter of the drive train. That discontinuance in particular occurs when, as a function of the indicated operating parameters as well as the indicated control characteristics, it is established that the other control device is regulating that operating parameter. If need be, a priority characteristic or a master-slave process is provided so that the control of an operating parameter of the drive train is then discontinued when the control characteristics of the other control device, as well as the indicated operating parameters, indicate that the other control device is controlling that operating parameter, and if the priority characteristic or the master-slave method indicates that the control of that operating parameter by the other control device has priority.

Preferably, the engine control device and/or the clutch control device uses an operating parameter for control of a predetermined parameter, which can be controlled by the other of those control devices, or which is effected by adjusting a movable element of the other apparatus, thus of the clutch apparatus or of the engine.

It is especially preferably assured that the engine control device and the clutch control device are not regulating the same operating parameter of the drive train simultaneously. Preferably, it is assured that the engine control device and the clutch control device are not regulating the same operating parameter of the drive train to different values at the same time.

The control activities of the engine control device and of the clutch control device, or of those devices, are preferably coordinated in accordance with a predetermined master-slave process. That master-slave process is especially preferably configured as a function of predetermined operating parameters of the drive train, and/or as a function of the phase, such as a start-up phase or a drive phase in which a motor vehicle is being operated, and/or independently of individual or all aforementioned conditions, or in any other manner, it is in any given case determined which control or regulatory activities of which device have priority over those of the other. The master-slave process can be arranged such that, if need be, a control operation of an operating parameter already begun by a lower-ranking control device is interrupted if a corresponding priority of the other control device is determined, or such that the commenced control operations are substantially not interrupted, or such that, prior to beginning a regulation operation, there is a check whether a higher-ranking control device wishes to regulate the same operating parameter, or in other ways.

Preferably, the signals that are transmitted between the engine and the clutch control device, or between an overriding control device, and the engine control device or the clutch control device, are electrical signals.

Preferably, the engine control device, as well as the clutch control device, can cause a change in the engine rotational speed and/or engine torque, and especially through a regulation of that operating parameter.

Preferably, the clutch control device is prevented from governing engine rotational speed if the internal combustion engine is in an idle phase, or if the engine control device is regulating engine rotational speed.

The engine rotational speed can be especially preferably regulated by the engine control device, as well as by the clutch control device, whereby it is assured that those control devices do not simultaneously regulate engine rotational speed.

Preferably, it is assured that undesired feedback does not arise between the control activities of the engine control device and the clutch control device, such as especially owing to the simultaneous utilization of an identical controlled variable. That is especially assured by means of a master-slave process.

Preferably, the clutch control device can report to the engine control device how that engine control device should regulate a predetermined parameter, or vice versa. It is especially preferably provided that the engine control device monitors the clutch apparatus and/or the internal combustion engine and/or the clutch control device monitors the internal combustion engine and/or the clutch apparatus. Preferably, it is provided that the clutch control device indicates to the engine control device which engine torque or which engine rotational speed it is expecting, whereby the engine control device then causes the corresponding regulation of that operating parameter.

In accordance with the invention, in particular a control device arrangement is provided for control of at least one operating parameter of a motor vehicle drive train, whereby a gradient regulator is provided. That gradient regulator causes the engine rotational speed and the transmission rotational speed to approach each other and, indeed, especially at the end of the start-up phase. The gradient regulator alternatively or additionally causes the start-up rotational speeds, which exist at the end of the start-up phase, substantially to correspond with the drive rotational speeds. The drive rotational speeds are especially rotational speeds that exist in accordance with a predetermined characteristic at the beginning of the drive phase. The gradient regulator especially operates to prevent an overspeed of the engine rotational speed, or, if necessary, the transmission rotational speed, at the end of the start-up phase, that is, particularly, the rotational speeds at the end of the start-up phase that lie above the rotational speeds that should exist at the beginning of the drive phase in accordance with a predetermined characteristic or a specification.

Within the meaning of the present invention, by "control" is to be understood especially "govern" and/or "control" within the meaning of DIN. The corresponding meaning applies to concepts derived from the concept "control."

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
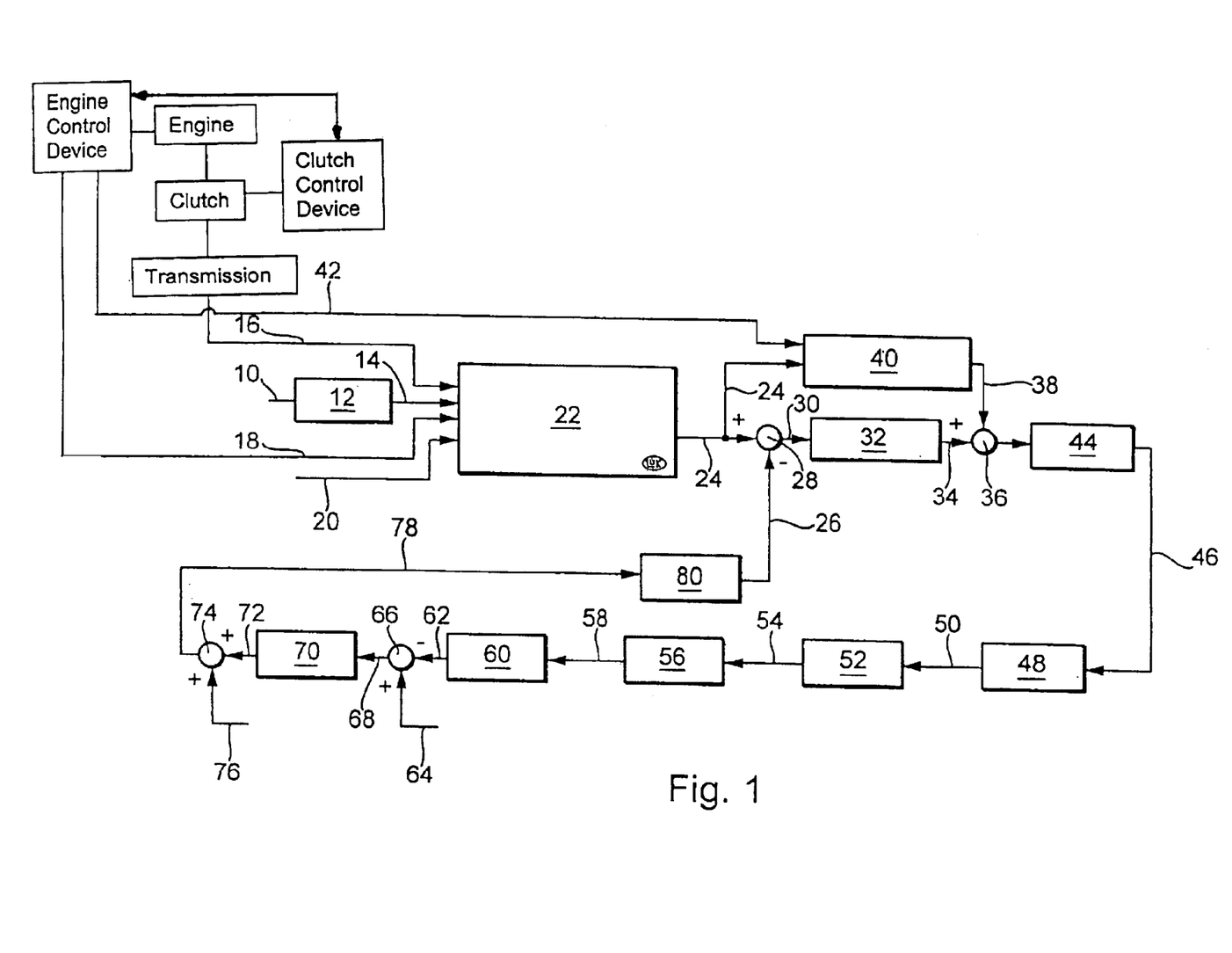
FIG. 1 shows one embodiment of a method in accordance with the invention in a schematic, block-diagram representation.

FIG. 1 shows an exemplary embodiment of the invention in a schematic, block-diagram representation. On the basis of a signal 10 indicative of the accelerator pedal angle, an engine target torque is determined in step 12. As a function of the signal 14 indicative of the engine target torque as well as a signal 16 indicative of the transmission rotational speed, a signal 18 indicative of the engine rotational speed and a signal 20 indicative of the gradient of the transmission rotational speed, a target engine rotational speed gradient or an allowable or maximum or minimal target engine rotational speed gradient is established in step 22, and, to be sure, depending particularly upon a function that depends upon the difference between the target and the actual engine rotational speed, and as a function of a product added to that function on the basis of a transmission rotational speed gradient and a superimposition function. The superimposition function rises unvaryingly as a function of the ratios of the transmission rotational speed and the engine rotational speed. A signal 24, which, if need be, indicates the restricted or allowed target engine rotational speed gradient, is subsequently compared with a signal 26, which indicates the actual engine rotational speed gradient. Accordingly, in step 28, the difference between the target and actual engine rotational speed gradients is determined.

The difference signal 30 is fed to a proportional plus integral control unit 32, which generates a regulating component of the engine target torque, which is added as signal 34 in step 36 to a pre-control component, which is indicated as signal 38 and was determined in step 40.

Signal 38 is determined in step 40 on the basis of signal 24, which was produced in step 22, and indicates the target engine rotational speed gradient, as well as a function of a signal 42, which was transmitted by the engine control device and which indicates engine torque.

A engine target torque is determined in step 44 which corresponds particularly to the sum of the pre-control component of the engine target torque and the regulation component of the engine target torque, and which is transmitted as signal 46.

A target current is determined in step 48 on the basis of the engine target torque, which is transmitted as signal 50 to current regulator 52. The determination of the target current on the basis of the engine target torque is determined in step 48, especially by means of suitable software.

An actual current 54 is determined in current regulator 52, which is utilized to control a hydraulic arrangement 56. The hydraulic arrangement 56 produces an actual pressure 58, which loads the clutch apparatus 60 and produces a predetermined position of the clutch apparatus 60. If need be, the characteristic of the clutch apparatus is mapped in the control software.

The actual torque or engine actual torque produced or theoretically produced by the load on the clutch apparatus is determined and is indicated as signal 62. That engine actual torque 62 is subtracted from engine target torque 64 in step 66, and on the basis of the torque difference 68, and a corresponding rotational speed 72 is determined in accordance with engine characteristic 70.

That rotational speed, which is particularly a change in target rotational speed, is added in step 74 to engine rotational speed 76, which was provided at a predetermined reference time point, especially during a last or previous regulation. That summation signal is the engine rotational speed 78.

In step 80, the gradient of the engine rotational speed 78 is determined. The corresponding signal 26 is, as already explained, compared in step 28 with the engine torque target gradients.

Figure 2:
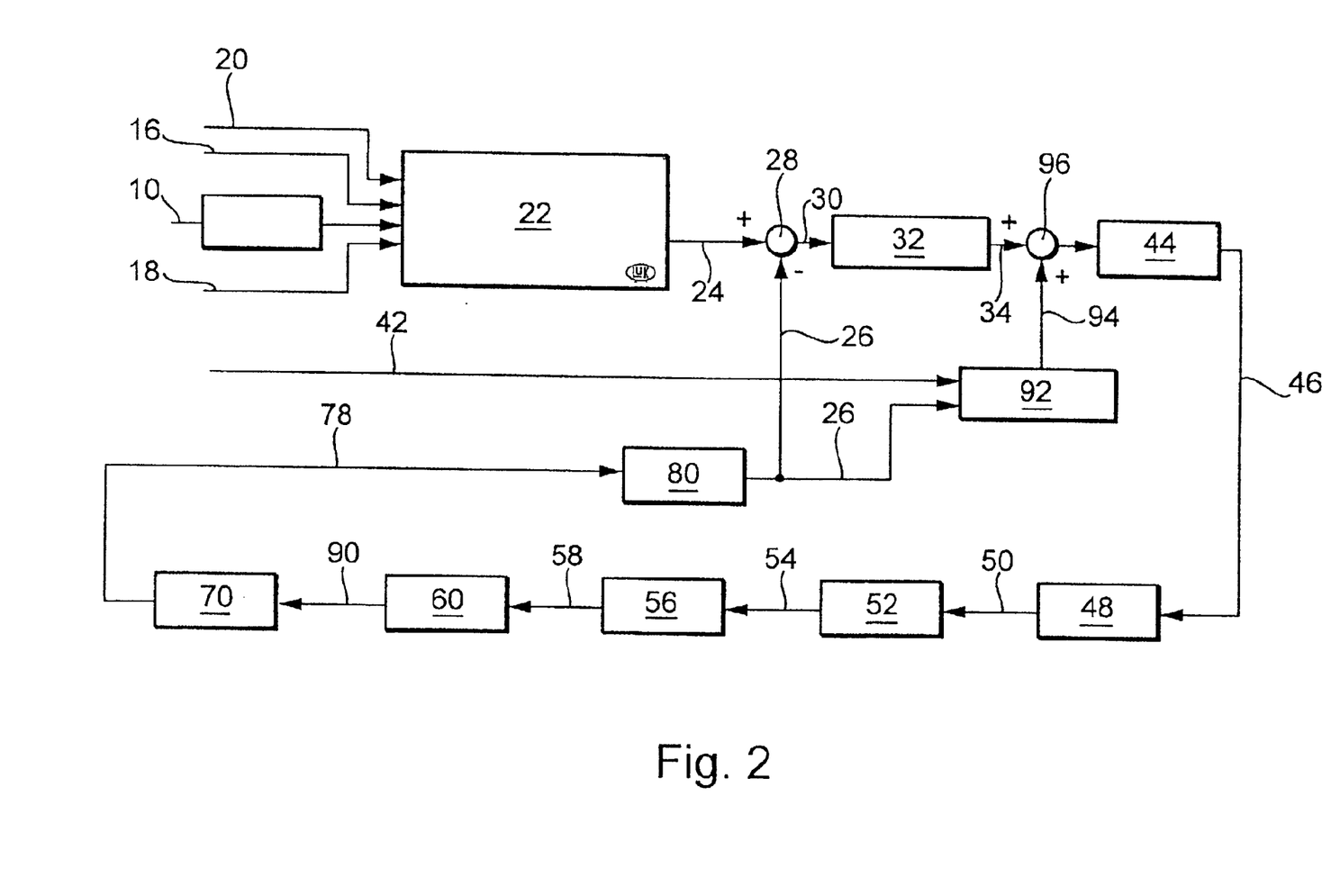
FIG. 2 shows another embodiment of a method in accordance with the invention in schematic, block-diagram representation.

FIG. 2 shows another exemplary embodiment of the invention in schematic, block-diagram representation.

The embodiment represented in FIG. 2 differs from the embodiment shown in FIG. 1 especially in that instead of differential signal 68, an engine actual torque caused by the clutch characteristic or a corresponding signal 90 is converted on the basis of engine characteristic 70 into a signal that corresponds with engine rotational speed 78.

The embodiment in accordance with FIG. 2 differs further, especially by the arrangement of the engine torques pre-control.

The engine torques pre-control 92 is determined in the embodiment in accordance with FIG. 2 as a function of the engine torque signal 42 of the engine control device, as well as a function of the actual engine rotational speed gradient 26. The corresponding pre-control component 94 is added in step 96 to the regulator component of the engine target torque or engine torque 34.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicant reserves the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for controlling at least one drive train component of a motor vehicle which has a drive apparatus as well as a clutch apparatus arranged In the drive train, an engine control device, and a clutch control device, said method comprising the steps of:

a) controlling the position of at least a first predetermined component of the drive apparatus by the engine control device, whereby at least a first operating parameter of the drive train is controlled by the engine control device;

b) controlling the position of at least a second predetermined component of the clutch apparatus by the clutch control device, whereby at least a second operating parameter of the drive train is controlled by the clutch control device:

c) transmitting predetermined signals between the engine control, device and the clutch control device, which affect the control activities of at least one of those control devices; and d) maintaining below a predetermined difference limit a difference between an actual engine rotational speed gradient and a predetermined output side drive train rotational speed gradient by regulating the engine rotational speed gradient at a transition between a startup phase and a drive phase of the vehicle.

2. A method for controlling at least one drive train component of motor vehicle which has a drive apparatus as well as a clutch apparatus arranged in the drive train, an engine control device, and a clutch control device, said method comprising the steps of:

a) controlling the position of at least a first predetermined component of the drive apparatus by the engine control device, whereby at least a first operating parameter of the drive train is controlled by the engine control device;

b) controlling the position of at least a second predetermined component of the clutch apparatus by the clutch control device, whereby at least a second operating parameter of the drive train is controlled by the clutch control device;

c) providing by at least one of the control devices at least a part of its control characteristic to the other control device; and d) maintaining below a predetermined difference limit a difference between an actual engine rotational speed gradient and a predetermined output side drive train rotational speed gradient by regulating the engine rotational speed gradient at a transition between a startup phase and a drive phase of the vehicle.

3. A method for controlling at least one drive train component of a motor vehicle which has a drive apparatus as well as a clutch apparatus arranged in the drive train, an engine control device, and a clutch control device, said method comprising the steps of:

a) controlling the position of at least a first predetermined component of the drive apparatus by the engine control device, whereby at least a first operating parameter of the drive train is controlled by the engine control device;

b) controlling the position of at learnt a second predetermined component of the clutch apparatus by the clutch control device, whereby at least a second operating parameter of the drive train is controlled by the clutch control device;

c) conducting by one control device of predetermined control activities as a function of control activities of the other control device; and d) maintaining below a predetermined difference limit a difference between an actual engine rotational speed gradient and a predetermined output side drive train rotational speed gradient by regulating the engine rotational speed gradient at a transition between a startup phas and a drive phase of the vehicle.

4. A method for controlling at least one drive train component of a motor vehicle which has a drive apparatus as well as a clutch apparatus arranged in the drive train, an engine control device, and a clutch control device, said method comprising the steps of:

a) controlling the position of at least a first predetermined component of the drive apparatus by the engine control device, whereby at least a first operating parameter of the drive train is controlled by the engine control device;

b) controlling the position of at least a second predetermined component of the clutch apparatus by the clutch control device, whereby at least a second operating parameter of the drive train is controlled by the clutch control device;

c) coordinating control activities of the control devices under predetermined conditions by means of a priority characteristic; and d) maintaining below a predetermined difference limit a difference between an actual engine rotational speed gradient and a predetermined output side drive train rotational speed gradient by regulating the engine rotational speed gradient at a transition between a startup phase and a drive phase of the vehicle.

5. A method for controlling at least one drive train component of a motor vehicle which has a drive apparatus as well as a clutch apparatus arranged in the drive train, an engine control device, and a clutch control device, said method comprising the steps of:

a) controlling the position of at least a first predetermined component of the drive apparatus by the engine control device, whereby at least a first operating parameter of the drive train is controlled by the engine control device;

b) controlling the position of at least a second predetermined component of the clutch apparatus by the clutch control device, whereby at least a second operating parameter of the drive train is controlled by the clutch control device;

c) indicating by one of the control devices under predetermined conditions by means of a signal to the other control device that the one control device is regulating a predetermined operating parameter of the drive train; and d) maintaining below a predetermined difference limit a difference between an actual engine rotational speed gradient and a predetermined output side drive train rotational speed gradient by regulating the engine rotational speed gradient at a transition between a startup phase and a drive phase of the vehicle.

6. A method for controlling at least one drive train component of a motor vehicle, said method comprising the steps of:

a) controlling predetermined operating parameters of an engine of the motor vehicle in accordance with a start-up characteristic during a starting phase of the motor vehicle;

b) controlling predetermined operating parameters of the engine in accordance with a driving characteristic during a driving phase of the motor vehicle;

c) regulating one of the engine rotational speed and the engine rotational speed gradient during a start-up phase of the motor vehicle; and d) maintaining below a predetermined difference limit a difference between an actual engine rotational speed gradient and a predetermined output side drive train rotational speed gradient by regulating the engine rotational speed gradient at a transition between the starting phase and the driving phase of the vehicle.

7. A method for controlling at least one drive train component of a motor vehicle, said method comprising the steps of:

a) controlling predetermined operating parameters of an engine of the motor vehicle in accordance with a start-up characteristic during a starting phase of the motor vehicle;

b) controlling predetermined operating parameters of the engine in accordance with a driving characteristic during a driving phase of the motor vehicle;

c) specifying a predetermined rotational speed under load to be controlled when the engine rotational speed and a transmission rotational speed are substantially identical at the end of the of the starting phase;

d) maintaining a rotational speed differential between the engine rotational speed under load and the engine rotational speed at the end of the starting phase equal to the transmission rotational speed and greeter than zero; and e) maintaining below a predetermined difference limit a difference between an actual engine rotational speed gradient and a predetermined output side drive train rotational speed gradient by regulating the engine rotational speed gradient at a transition between the starting phase and the driving phase of the vehicle.

8. A method for controlling at least one drive train component of a motor vehicle, said method comprising the steps of:

a) controlling predetermined operating parameters of an engine of the motor vehicle in accordance with a start-up characteristic during a starting phase of the motor vehicle;

b) controlling predetermined operating parameters of the engine in accordance with a driving characteristic during a driving phase of the motor vehicle;

c) specifying a predetermined rotational speed under load to be controlled when the engine rotational speed and a transmission rotational speed are substantially identical at the end of the of the starting phase;

d) maintaining one of the engine rotational speed and the transmission rotational speed so that it does not substantially exceed the specified rotational speed under load until the engine rotational speed and the transmission rotational speed jointly reach the specified speed under load; and e) maintaining below a predetermined difference limit difference between an actual engine rotations speed gradient and a predetermined output side drive train rotational speed gradient by regulating the engine rotational speed gradient at a transiton between the starting phase and the driving phase of the vehicle.

9. A method according to claim 1, including the step of predetermining a target engine rotational speed.

10. A method according to claim 9, wherein the target engine rotational speed is a function of an accelerator pedal position.

11. A method according to claim 1, including the step of providing a target engine rotational speed gradient as a function of a predetermined third operating parameter.

12. A method according to claim 1, including the step of providing a target engine rotational speed gradient that is specified as a function of the target engine rotational speed.

13. A method according to claim 1, including the step of providing a target engine rotational speed gradient as a function of an actual engine rotational speed.

14. A method according to claim 1, including the step of providing a target engine rotational speed gradient as a function of a predetermined rotational speed differential.

15. A method according to claim 1, including the step of providing a target engine rotational speed gradient as a function of an output-side rotational speed gradient.

16. A method according to claim 1, including the step of providing a target engine rotational speed gradient as a function of a superimposition characteristic.

17. A method according to claim 1, including the step of providing a target engine rotational speed gradient as a function of a predetermined rotational speed ratio of an output-side rotation speed and an engine rotational speed.

18. A method according to claim 16, wherein the superimposition characteristic is a function of a predetermined rotational speed ratio based on an output-side rotational speed and an engine rotational speed.

19. A method according to claim 16, wherein superimposition characteristic is such that the gradient of an output-side rational speed is considered in determining the target engine rotational speed gradient as a function of a predetermined characteristic.

20. A method according to claim 16, wherein the superimposition characteristic is such that the gradient of an output-side rotational speed is considered in determining the target engine rotational speed gradient as a function of a rotational speed quotient from an output-side rotational speed and an engine rotational speed.

21. A method according to claim 15, wherein the target engine rotational speed gradient increases with an increase of the output-side rotational speed gradient.

22. A method according to claim 1, wherein a target engine rotational speed gradient as a function of the sum of a function of a rotational speed differential and a function of an output-side rotational speed gradient.

23. A method according to claim 1, including the step of determining a pro-control component of an engine target torque in accordance with a predetermined characteristic curve.

24. A method according to claim 23, wherein a signal indicative of an engine actual torque is utilized for determining the engine target torque.

25. A method according to claim 1, including the step of determining an engine target torque as a function of at least one engine rotational speed.

26. A method according to claim 1, including the step of determining an engine target torque as a function of at least one engine rotational speed gradient.

27. A method according to claim 1, including the step of determining a clutch target torque as a function of at least one engine rotational speed gradient.

28. A method according to claim 1, including the step of determining an engine target torque utilizing a regulator.

29. A method according to claim 1, including the step of determining the output-side rotational speed by calculation.

30. A method according to claim 1, including the step of determining the output-side rotational speed by measurement.

31. A method according to claim 1, wherein the engine control device makes available a value of engine torque that is being utilized.

32. A method according to claim 31, wherein the engine torque utilized is a function of a filtered signal from the engine control device.

33. A method according to claim 31, wherein the engine torque utilized is a function of a signal from the engine control device, whereby the gradient of that engine torque is restricted.

34. A method according to claim 1, wherein the control devices at all times exchange signals with an overriding control device, and that overriding control device effects a coordination of the control activities of those control devices.

35. A method according to claim 1, wherein in at least one of the control devices in which at least a part of the control characteristic of the other of those control devices is made available, that part of the control characteristic of the other of those, control devices is stored.

36. A method according to claim 1, wherein at least one of the control devices in which at least a part of the control characteristic of the other of those control devices is made available, controls at least one parameter as a function of an available portion of the control characteristic, whereby that available portion of the control characteristic of the other control device is stored in that control device.

37. A method according to claim 1, wherein at least one of the control devices uses en operating parameter to control an operating parameter controlled by that control device which can be controlled by the other of those control devices and/or which is brought about by the position of at least a predetermined structural component.

38. A method according to claim 1, wherein at least one of the control devices refrains under predetermined conditions from a desired control of a parameter as a function of at least one signal that is transmitted from the other of those control devices to that control device.

39. A method according to claim 1, wherein control activities of one of the clutch control device and of the engine control device in any given case attempts to simultaneously affect a drive train parameter then being controlled by the other control device, then the control activities of particular attempting control device are omitted.

40. A method according to claim 1, wherein the engine control device and the clutch control device do not simultaneously govern the same operating parameter of the drive train.

41. A method according to claim 1, wherein control activities of the engine control device and of the clutch control device are coordinated in accordance with a predetermined master-slave method.

42. A method according to claim 1, wherein the signals transmitted between the engine control device and the clutch control device are electrical signals.

43. A method according to claim 1, wherein the first operating parameter is the engine rotational speed.

44. A method according to claim 1, wherein the clutch control device brings about a change in one of the engine rotational speed and the engine torque.

45. A method according to claim 1, wherein influence of engine rotational speed by means of the clutch control device is prevented when the drive apparatus is operated in an idling phase.

46. A method according to claim 1, wherein the engine control device and the clutch control device do not simultaneously control the engine rotational speed when the engine control unit, under predetermined first conditions, issues a signal to control the engine rotational speed, and the clutch control unit, under predetermined second conditions, issues a signal control the engine rotational speed.

* * * * *